United States Patent Office 3,338,717
Patented Aug. 29, 1967

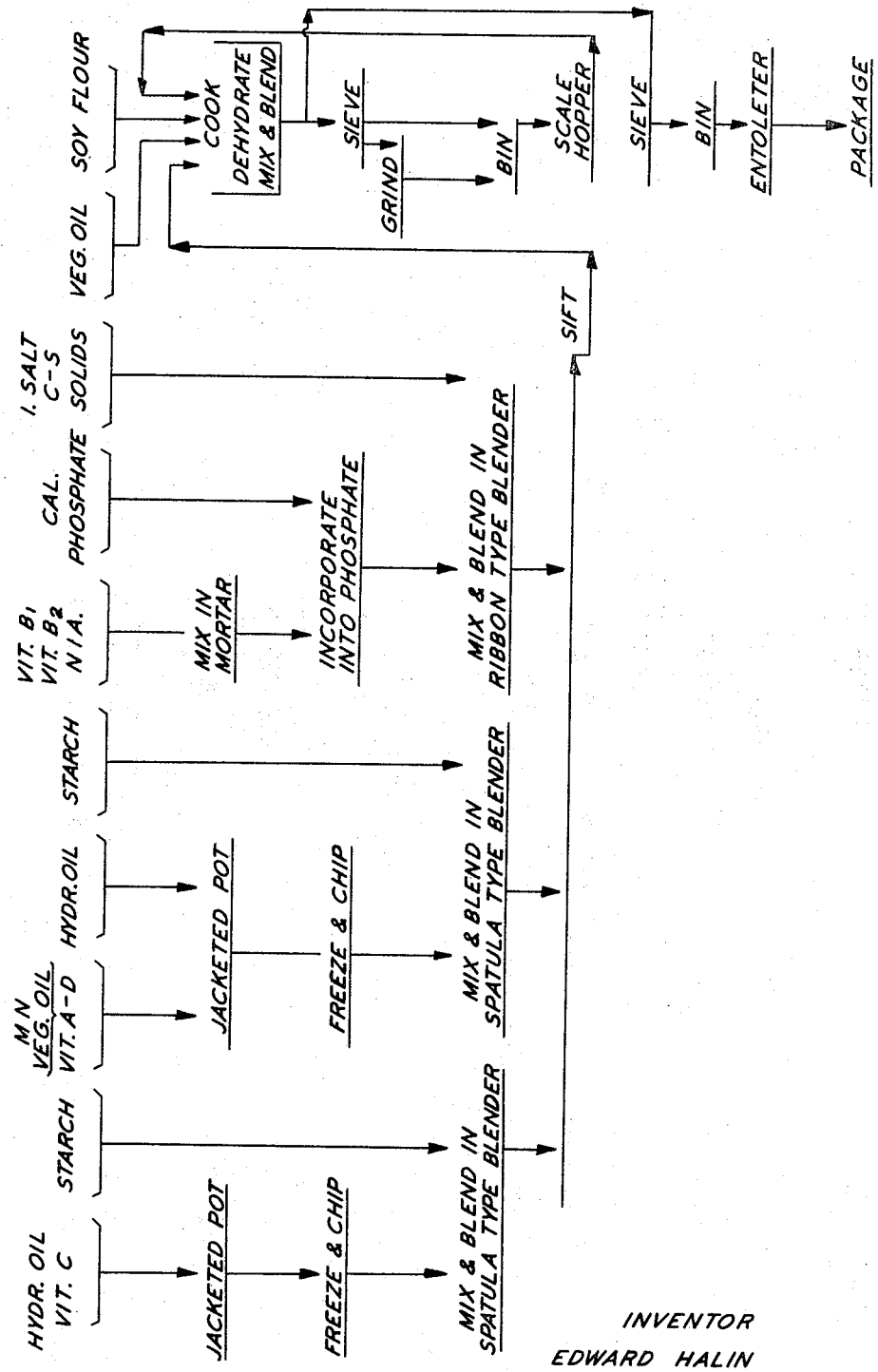

3,338,717
PREPARATION OF A STABILIZED
NUTRITIONAL FOOD
Edward Halin, 9221 Laramie Road,
Philadelphia, Pa. 19115
Filed Feb. 19, 1965, Ser. No. 433,923
2 Claims. (Cl. 99—1)

ABSTRACT OF THE DISCLOSURE

Preparation of a stabilized food having high assimilability comprising process soybean meal, vegetable oil, arrowroot starch, saccharide, hydrogenated oil, vitamins and other additives by blending a portion of the starch with a portion of the vegetable oil containing vitamin C, blending vitamins with a portion of the hydrogenated oil, blending vitamin B compounds, iodized salt, calcium phosphate and iron salt with a saccharide, steaming and drying soybean meal, and incorporating all of these substances into the remainder of the vegetable oil.

---

This invention relates to food materials, especially for human consumption, and the preparation thereof.

It is the principal object of the present invention to provide a food material for human consumption which is palatable, nutritious, economical, non-allergenic and balanced.

It is a further object of the present invention to provide a food material of the character aforesaid which may be employed in tablet form, in powdered form or in liquid suspension, as desired.

It is a further object of the present invention to provide a food material having vitamins present in stable form and adjustable for either infant and child, youth and adult, or aged person, as required.

It is a further object of the present invention to provide a food material containing vitamins in which the vitamins have been stabilized in an improved manner to enhance the keeping qualities and shelf life.

It is a further object of the present invention to provide a food material which furnishes in relation to the calorie level the essential quantities of vitamins and minerals at desired levels which may be significantly greater than the minimum standards recommended by the Food and Nutrition Board of the National Research Council.

It is a further object of the present invention to provide a food material, as aforesaid, in which the protein is prepared in a manner to obtain its full efficiency for assimilation by the user, even if the user is an infant.

It is a further object of the present invention to provide improved methods for preparing the aforesaid food material.

Other objects and advantageous features of the invention will be apparent from the description and claims.

The nature and characteristic features of the invention will be more readily understood from the following description taken in connection with the accompanying drawing forming part thereof, in which the figure shows a flow sheet for the preparation of the food material of the present invention.

It should, of course, be understood that the description and drawing herein are merely illustrative and that various modifications and changes can be made without departing from the spirit of the invention.

The process of the present invention is carried out in a plurality of interrelated steps in order to achieve the aforementioned benefits. For the purposes of describing the process of this invention, the aforementioned drawing has been numbered from 1 to 5 to indicate the various steps concerned. As will be apparent to those skilled in the art from the following description, the various steps need not be conducted in rigid numerical order. Nor is it necessary that these steps be carried out successively. Two or more of the steps may be effected concurrently, if desired. The important consideration is that the components prepared in each of the multiple steps, preferably five, meet ultimately for final blending in order to produce the unique and valuable food material of the present invention. The amounts of components employed, particularly in relation to each other are significant and will be fully discussed hereinafter.

Step 1 comprises introducing a predetermined amount of vitamin C into a stated amount of edible hydrogenated oil heated sufficiently to be substantially in the liquid state. Generally, temperatures of about 40° to 60° C., preferably about 45° C., are adequate for this purpose, depending largely on the particular oil employed. Suitable hydrogenated oils include hydrogenated cotton seed oil, hydrogenated soybean oil, hydrogenated safflower oil, hydrogenated olive oil, and hydrogenated peanut oil, among others. Also suitable in this respect is coconut oil, which is a naturally occurring saturated oil and is, in that sense, already the equivalent of the aforementioned oils that occur naturally in the unsaturated condition and have to be hydrogenated for the present purposes. Coconut oil is expressly included within the gamut of this invention. If desired, one may employ selected mixtures of the aforedescribed oils instead of an individual embodiment. All of these oils, as is known, are various mixtures of glycerides of fatty acids.

The mixture of vitamin C and the edible hydrogenated oil is stirred, preferably slowly, to keep the vitamin C in substantially uniform suspension and then cooled until it solidifies. It is preferred to keep this mixture in a closed container at a temperature of about 5° to 10° C. until it is completely solidified. After complete solidification, the mixture is cut, chipped or shredded, as desired, in order to get it into the form of reasonably small particles. In this particulated form, it is introduced into a blender, along with a weighed portion of finely particled arrowroot starch. While the type of blender is not particularly critical, the commercially available spatula type blenders are quite satisfactory for the present purposes. In place of the arrowroot starch, there may be used potato starch or mixtures of these, if desired. The specificity of this component is based on the presence of a wide range of desired nutritional factors, along with a high degree of ready assimilability. The mixture of the Step 1 components is then ready for blending with any or all of the components of the other four steps of the present process.

In Step 2, a weighed portion of 2-methyl-1-naphthoquinone (vitamin K) is added to and dissolved in a defined amount of an edible vegetable oil, such as olive oil, cottonseed oil, soybean oil, peanut oil, or the like, or mixtures thereof. There is added to the oil solution a predetermined amount of vitamin A and vitamin D dissolved in a weighed portion of an edible hydrogenated oil, which has been heated to about 40° to 60° C., preferably about 45° C., in order to convert it into the liquid state. This edible hydrogenated oil is the same kind as used in Step 1 and may be the same or different embodiment or mixtures thereof. The mixture is stirred in order to promote solution of the various parts. The system is then chilled to about 5° to 10° C. and the solution stored, preferably in a closed container, until it completely solidifies. After solidification, this material is cut, chipped or shredded, as desired, into reasonably small particles and introduced into a blender. A weighed portion of arrowroot starch is also added to the blender and thoroughly mixed with the previously described material. While the type of blender, as previously stated in Step 1, is not particularly critical, the commercially available spatula type blenders produce satisfactory blends. The components prepared according to Step 2 are then ready to be blended with components of Step 1 and the components of the subsequent steps.

In Step 3, there are intimately ground together, preferably in a mortar or similar device, predetermined amounts of at least vitamin $B_1$ (thiamin hydrochloride), vitamin $B_2$ (riboflavin) and vitamin $B_5$ (nicotinamide or niacin). In most instances, particularly when the final food product of this invention is intended for adults, there are also incorporated defined amounts of vitamin $B_6$ (pyridoxine), vitamin $B_4$ or H (biotin) and vitamin $B_{12}$ (pantothenic acid or cobalamine). To these vitamins is added a defined amount of finely comminuted calcium phosphate. If it is desired to incorporate iron into the present formulation, there is, also, added a weighed portion of finely divided ferrous sulphate, ferrous gluconate or the like. In many instances, particularly when the requirements of adults are contemplated, there are also incorporated other mineral sources, such as manganese sulfate, potassium chloride, zinc sulfate, magnesium sulfate, among others. The above-described vitamins and salt or salts are added to a blender and intimately mixed with weighed amounts of iodized salt and a saccharide, preferably a monosaccharide, such as glucose. The glucose may be conveniently obtained in the form of dried corn syrup solids which are readily available commercially. Also satisfactory in this respect are disaccharides, such as sucrose and the like. All of these components are blended to a uniform consistency and distribution in a blender, such as the ribbon type. The components of Step 3 are then ready for mixing and blending with the components of the other steps.

In Step 4, there is introduced into a preheated pressurizable vessel at 10 pounds steam pressure such as an autoclave or other pressure regulable cooking vessel, a predetermined amount of soybean meal or flour. The soybeam meal is heated with agitation at about 200 to 230° F., preferably 210° to 220° F. with live steam introduced into the inner jacket of the autoclave, and with steam at lower pressure, about 4 to 5½ pounds introduced inside the autoclave for about 10 to 18 minutes, preferably about 12 to 15 minutes. In order to remove the condensed steam, a vacuum is applied, 25 to 27 inches of vacuum being satisfactory for this purpose, applied for about three minutes, although greater vacuum may be employed, if needed. The soybean flour is then cooled in the autoclave and passed through a screen, preferably about 100 mesh. The portions held on the screen are processed through a mill or grinder to comminute finely the larger particles of the processed soybean meal and thereby provide the soybean meal in a substantially uniform particle size. In this regard, the use of soybean meal or flour must be adhered to strictly in order to achieve the valuable results of this invention. The soybean flour is then ready to be blended with the other components of the other steps and can conveniently be readied for the final blending by storing in a bin or like enclosure and then the quantity required is used as desired.

Step 5 consists of introducing a weighed amount of an edible vegetable oil into a mixing or blending vessel. This edible vegetable oil is the same kind as defined under Step 2 and may be the same or different embodiment or mixtures thereof, as desired. As indicated previously, the components of the various five steps may be introduced in any order into the final mixer or blender. It is preferred to introduce first the edible vegetable oil of Step 5, followed by a blend of the components of Steps 1, 2 and 3, and finally by the processed soybean meal of Step 4 or the latter two may be reversed. In any case, the components of Steps 1 through 5 are intimately mixed and blended. The total blend is then screened to provide a uniform particle size in the product, processed, if desired, through an entoleter or similar device and then finally packaged.

It will be apparent to those skilled in the art that the times required for processing the components of the several steps will vary. By observing the times required in each step, it is possible to develop a satisfactory sequence of steps so that the total process is efficiently consummated either on a substantially continuous or batch basis. The process can be readily applied to a wide range of amounts of food material to be produced varying from laboratory adaptations for about 25 pounds or less to full commercial development of 2500 pounds or more. In any case, there is consistently produced a valuable food material of enhanced nutrient factors, ready assimilability and marked stability through periods of prolonged storage.

In order to realize the objects of this invention, one must employ the various components, previously delineated, within particular percentages by weight, as follows:

| | Percent |
|---|---|
| Processed soybean meal | 30 to 62 |
| Edible vegetable oil | 12 to 40 |
| Arrowroot starch or equivalent | 9 to 25 |
| Saccharide | 6 to 10 |
| Edible hydrogenated oil | 1 to 5 |
| Calcium phosphate | 3.16 to 4.5 |
| Iodized salt | 0.75 to 1.5 |
| Vitamins, as noted below. | |

The above named components are to be calculated to total 100%, then sufficient vitamin and mineral supplements are added to supply the known amounts required for contemplated users. In this respect, for instance, for children, generally about 25,000 USP units of vitamin A per day is adequate and about 1380 USP units of vitamin D daily is generally sufficient. Similarly with the other vitamins and minerals. Adults and especially those with known nutritional inadequacies or deficiencies may require up to 25,000 to 30,000 or more USP units of vitamin A daily and up to about 275 to 300 USP units of vitamin D per day. The other vitamins and minerals are also usually required in greater amounts, as is known. Furthermore, it is important that, in a food material containing predetermined amounts of nutritive values for particular users, those values remain constant for prolonged periods of storage without appreciable diminution or degradation. A particularly valuable attribute of the food material of the present invention is the stability of its many components and nutrient values.

As a complete daily food material and, therefore, valuable in diet control, the above composition showing percentages by weight can be determined on the basis of about 20 to 40 grams of soybean meal with vitamins and minerals added, as desired. Of course, it is known already to those skilled in the art that the required components of the food material, previously defined, contain appreciable vitamin and mineral values. However, in most instances, additional vitamin and mineral values are desired and are, therefore, added to and become part of the food material of this invention. The word "processed," used with respect to the soybean meal discussed hereinbefore, refers to soybean meal that has been subjected to direct steam pressures reaching the stated temperatures of about 200° to 230° F. for about 10 to 18 minutes, then vacuum is applied to remove the condensate water ranging from just below normal atmospheric pressure down to about 25 inches. The word "processed" is to be construed in this sense.

A preferred specific formulation for children from infancy to about 10 or 12 years of age is, in parts by weight, as follows:

| | |
|---|---|
| Processed soybean meal | 30 |
| Edible vegetable oil | 15 |
| Arrowroot starch or equivalent | 16 |
| Saccharide | 18 |
| Calcium phosphate | 3.2 |
| Iodized salt | 1 |
| Vitamins | 1 |

For older persons beyond about 40 years of age the same specific formulation will be used except for variation in the vitamin content, and particularly an increase of the ascorbic acid which is important in the development of connective tissues.

For persons in the age range from about 12 to 40 years of age the same specific formulation can be employed but with the vitamin content modified.

The relationship among vitamins for a daily administration of useful therapeutic formulation, is as follows:

| | | |
|---|---|---|
| Vitamin A | USP units | 25,000 |
| Vitamin B | do | 1,000 |
| Thiamine hydrochloride | mg | 10 |
| Riboflavin | mg | 5 |
| Nicotinamide | mg | 100 |
| Tyriboxin hydrochloride | mg | 5 |
| Cobalamine ($B_{12}$) | mcg | 20 |
| Panthothenate | mg | 20 |
| Ascorbic acid | mg | 200 |

The quantity of ascorbic acid is preferably increased for aged persons, ascorbic acid being important in the development of connective tissues.

The food material can be employed in a wide range of gastronomically pleasant ways, such as in water, milk, fruit or vegetable juices, other beverages or on cereal, among others, as desired. In all instances, the valuable results discussed hereinbefore are consistently obtained.

I claim:
1. A method for the preparation of a food material characterized by stability of nutritive values and high assimilability comprising in parts by weight a substantially uniform blend of:

| | |
|---|---|
| Processed soybean meal | 30 to 62 |
| Edible vegetable oil | 12 to 40 |
| Arrowroot starch | 9 to 25 |
| Saccharide | 6 to 10 |
| Edible hydrogenated oil | 1 to 5 |
| Iodized salt | 0.75 to 1.5 | comprising substantially intimately and uniformly mixing the component parts in suitable particle size in selected blending steps, said steps comprising
 (a) Mixing and blending a portion of said starch with a blend of a portion of said vegetable oil and with vitamin C;
 (b) Blending 2-methyl-1-naphthoquinone in a portion of said vegetable oil and adding vitamins A and D thereto and mixing therewith a portion of said hydrogenated oil, solidifying the resulting solution, comminuting the solidified material and blending said solidified material with a portion of said starch;
 (c) Blending selected vitamin B compounds with calcium phosphate iodized salt and a nutritional iron salt, incorporating therewith a selected saccharide;
 (d) Subjecting said soybean meal before the incorporation into the material to temperatures of about 200° to 230° F. for about 10 to 18 minutes, under direct steam pressure and then vacuum drying the meal; and
 (e) Introducing a portion of said vegetable oil into a mixing container and adding thereto, in any selected order and combinations thereof, the substances produced in each of the preceding steps.

2. A method according to claim 1 wherein said vegetable material is finely comminuted to desired particle size by at least one screening and grinding procedure, and optionally terminally entoletered.

References Cited
UNITED STATES PATENTS

| | | | |
|---|---|---|---|
| 2,402,675 | 6/1946 | Schaffner | 99—204 |
| 3,097,947 | 7/1963 | Kemmerer | 99—63 |
| 3,185,574 | 5/1965 | Gabby et al. | 99—14 X |
| 3,219,454 | 11/1965 | Howard et al. | 99—63 X |
| 3,290,155 | 12/1966 | Mustakas et al. | 99—98 |

A. LOUIS MONACELL, *Primary Examiner.*

RAYMOND N. JONES, *Examiner.*

S. E. HEYMAN, *Assistant Examiner.*